United States Patent [19]
Kelley

[11] Patent Number: 4,562,904
[45] Date of Patent: Jan. 7, 1986

[54] STOP SYSTEM FOR A CENTER PIVOT IRRIGATION SYSTEM

[76] Inventor: Donald C. Kelley, Rte. 2, Earth, Tex. 79031

[21] Appl. No.: 590,998

[22] Filed: Mar. 19, 1984

[51] Int. Cl.⁴ .............................................. B60T 3/00
[52] U.S. Cl. .................................. 188/32; 239/177.1; 239/710
[58] Field of Search ............... 188/4 B, 32; 187/8.52; 239/177.1, 177.2, 710; 410/30; D12/217; 211/23; 70/182, 183, 226; 105/159

[56] References Cited

U.S. PATENT DOCUMENTS

| | | | |
|---|---|---|---|
| 501,511 | 7/1893 | Howard | 130/1 |
| 698,231 | 4/1902 | Starzman | 188/32 |
| 1,483,971 | 2/1924 | Grossman | 193/35 A |
| 1,943,003 | 1/1934 | Cochin | 188/32 X |
| 2,414,383 | 1/1947 | Merriam | 188/32 |
| 3,119,466 | 1/1964 | Gilson | 188/32 |
| 3,459,280 | 8/1969 | Grimm | 188/32 X |
| 3,605,954 | 9/1971 | Wakabayashi et al. | 188/32 X |
| 3,934,683 | 1/1976 | Walker | 188/32 |
| 4,095,679 | 6/1978 | Walker | 188/32 |
| 4,108,200 | 8/1978 | Cornelius | 239/177.1 X |
| 4,219,115 | 8/1980 | Moore | 198/781 |
| 4,312,452 | 1/1982 | Waier | 188/32 X |

Primary Examiner—Duane A. Reger
Assistant Examiner—Richard R. Diefendorf
Attorney, Agent, or Firm—Marcus L. Bates

[57] ABSTRACT

A stop system for a pivotal irrigation apparatus or system. The stop system includes a ladder-like platform which is laid down flat on the ground in the projected path of travel of one set of driven tower wheels, so that the wheels are driven upon the platform. Each wheel of one tower becomes aligned in supported relationship within a set of spaced rollers. The rollers support the rotating wheels of the tower and prevent relative movement of the tower respective to the ground. Consequently, the tower is rendered immobile respective to the other towers of the traveling irrigation system. This action causes the traveling irrigation system to be shut down, whereupon all of the tower wheels are rendered inoperative. When it is desired to move the traveling irrigation system, the spaced rollers are locked against rotation and the tower wheels energized. This causes the wheels to rotate and drive the tower off of the platform in either desired direction of travel.

13 Claims, 6 Drawing Figures

STOP SYSTEM FOR A CENTER PIVOT IRRIGATION SYSTEM

BACKGROUND OF THE INVENTION

Traveling irrigation system, including the center pivot and straight line travel type, generally are supported by a plurality of spaced towers. Each tower has fore and aft drive wheels arranged to propel the entire system. The traveling irrigation system is extremely costly and extensive physical damage can be caused to the system itself as well as to any house, barn, or oilwell that might be in the path of travel of the system as it moves along the ground. Traveling irrigation systems are geared in such a manner that they develop great driving force, and accordingly, can cause great damage to any obstruction encountered while they are traveling across a field.

Most expensive traveling irrigation systems have a safety shut-down system incorporated into at least one tower thereof. The shut-down is actuated to interrupt and deactivate the irrigation system when a selected drive tower fails to move within a predetermined time period, usually of five minutes duration.

It is therefore desirable to incorporate a stop device, as contemplated by the present invention, in order to obviate situations such as described above. The stop devise is placed in the path of travel of the tower of the traveling irrigation system which controls the entire system, to thereby enable the drive wheels of the selected tower to enter the stop device and cause the entire system to be shut-down.

Walker, U.S. Pat. No. 4,095,679, describes a stop means for self-propelled sprinklers. However, the Walker stop device includes a vertical frame at the forward end thereof which abuttingly receives one of the tower wheels thereagainst. Accordingly, it is necessary to reverse the direction of travel of the self propelled sprinkler when it is desired to assume operation thereof.

It would be advantageous to have made available a stop device for a traveling irrigation system which enables one person to render the rollers thereof non-rotatable, and moreover, to have a unique stop system which enables the tower wheels to drive onto and off of the support rollers of the stop system in either direction in a new and unusual manner. A system which achieves the above desired and unexpected result is the subject of the present invention.

PERTINENT PRIOR ART

U.S. Pat. No. 510,511 Keith
U.S. Pat. No. 1,483,971 Grossman
U.S. Pat. No. 1,943,003 Cochin
U.S. Pat. No. 2,414,383 Merriam
U.S. Pat. No. 3,119,466 Gilson
U.S. Pat. No. 3,459,280 Grimm
U.S. Pat. No. 3,605,954 Wakabayashi, et al.
U.S. Pat. No. 3,934,683 Walker
U.S. Pat. No. 4,095,679 Walker
U.S. Pat. No. 4,108,200 Cornelius
U.S. Pat. No. 4,219,115 Moore

SUMMARY OF THE INVENTION

This invention comprehends improvements in a stop mechanism for use in interrupting movement of a self propelled traveling irrigation apparatus or system of the type which is propelled by driven, ground engaging wheels. The stop mechanism is in the form of an elongated frame which is adapted to lie flat on the ground. The elongated frame includes opposed confronting side members and a plurality of lateral members are connected to the side members for supporting a wheel of the irrigation apparatus when the wheel travels across the frame in a longitudinal direction respective to the side members. A pair of rollers are arranged laterally respective to the side members. Each roller of the pair of rollers includes opposed ends journaled to said side members so that the rollers rotate about their longitudinal axis in low friction relationship respective to the elongated frame and to the ground.

The rollers and lateral members are spaced in close proximity to one another with the intervening space therebetween being limited to a value which enables a driven wheel of the traveling irrigation system to be supported free of the ground as it travels thereacross in a longitudinal direction respective to the side members.

Means are included for selectively securing each said roller against rotation so that the rollers can be rendered non-rotatable. Therefore, rotation of a wheel resting on the rollers enables the irrigation system to be driven in either direction from the stop mechanism.

In the preferred embodiment of the invention, there are two spaced pairs of rollers arranged perpendicularly respective to said side members and parallel to said lateral members so that a pair of longitudinally spaced wheels of a traveling irrigation system are simultaneously bottom supported by the spaced pair of rollers.

The lock mechanism associated with the rollers preferably is in the form of a bore formed laterally through part of each roller, with the bore of adjacent rollers being axially aligned with one another when the rollers are properly rotationally indexed respective to one another. When the bore of one roller of a pair of rollers is brought into axial alignment with the bore of an adjacent roller, an elongated rod-like member is extended through each of the bores and thereby locks one roller respective to an adjacent roller. The relative position of either roller can be changed by inserting a free marginal end portion of the bar through the bore and turning the roller with sufficient force to overcome the friction of the wheel resting thereon.

In a more specific embodiment of the present invention, the bore of the roller is formed through an extention formed on the roller at a location outwardly of the side member, thereby placing the means for selectively securing the roller at a convenient location respective to both the traveling irrigation system and the stop mechanism.

The lateral members and rollers of the stop mechanism are arranged at an elevation whereby a wheel traveling longitudinally across the stop mechanism must climb in elevation to a first pair of rollers, and then the wheel descends in elevation at the medial length of the stop mechanism, and then the wheel again climbs in elevation to the second pair of rollers, and then again descends in elevation and towards the ground at the opposed marginal end of the stop mechanism. This unique feature employs gravity to assist in propelling the massive weight of the irrigation system across the stop mechanism, as will be more fully appreciated later on by studying the drawings and disclosure.

Accordingly, a primary object of the present invention is the provision of an improved stop mechanism for use in interrupting the travel of a self propelled traveling irrigational system.

Another object of the present invention is the provision of a stop mechanism used in conjunction with a self propelled traveling irrigation system which enables the irrigation system to travel onto the stop mechanism whereupon the travel of the irrigation system interrupted by the employment of a low friction device which enables the wheels to rotate while travel is interrupted, and thereafter, the friction between the wheels and the stop mechanism is increased sufficiently to cause the rotating wheels to develop sufficient friction to travel across the other end of the stop mechanism.

Still another object of the present invention is the provision of an improved stop mechanism for use in interrupting the travel of a self propelled traveling irrigation system which enables the irrigation system to travel onto the stop mechanism, where the wheels supporting the irrigation system free wheels and thereby interrupts the travel of the self propelled traveling irrigation system.

Another and still further object of the present invention is the provision of a stop mechanism for placement in the projected path of a self propelled traveling irrigation system having a wheel which travels across the entire length of the stop mechanism and wherein the travel of the irrigation system is interrupted during the travel across the stop mechanism.

An additional object of the present invention is the provision of a stop mechanism for use in interrupting the travel of a self propelled traveling irrigation system which employs gravity by which one wheel of the irrigation system aids the other wheel to travel onto a set of rollers.

A still further object of the present invention is the provision of a stop mechanism which interrupts the travel of a self propelled traveling irrigation system, and which thereafter enables the irrigation system to be driven from the stop mechanism in either direction of travel by the employment of means for selectively securing a pair of rollers against rotation.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

DETAILED DESCRIPTION OF THE PREFERRED EMBODIMENT

Figure 1:
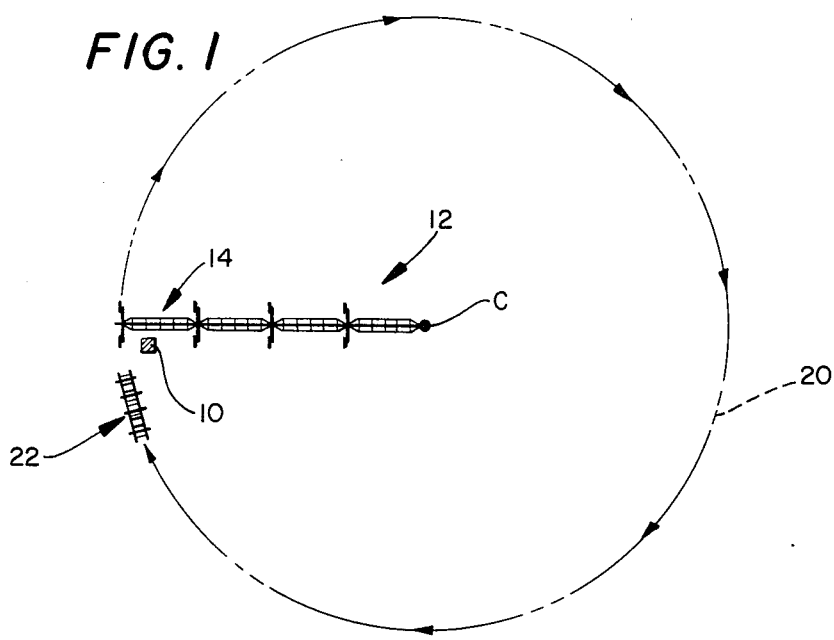
FIG. 1 is a part diagrammatical, part schematical, representation of a traveling irrigation apparatus which rotates about a centerpoint, with the present invention being diagrammatically illustrated in conjunction therewith.

In FIG. 1 of the drawings, there is diagrammatically disclosed a top plan view of an irrigated farm area having a barn, oilwell, or other construction 10 in the path of a traveling irrigation system 12, as for example, a Valley Sprinkler or a Reink Electrogator Irrigation System. It is therefore necessary that the traveling irrigation system be brought to a stop before the system encounters the obstruction 10, so that the obstruction can be removed from the path of travel, or alternatively, the direction of travel reversed. There are several other reasons for desiring to stop the travel of an irrigation system at some predetermined location.

Numeral 14 generally indicates an irrigation apparatus having a plurality of series connected, spaced apart towers and load carrying trusses which support a water conveying conduit. The conduit includes the usual plurality of sprinklers thereon for irrigating the underlying foilage as the irrigation system travels in a pivotal manner about center C. The present invention can also be used in conjunction with a straight line of travel irrigation system. Irrigation systems of both types are known to those skilled in the art, and the present invention described herein can be used in conjunction with either type.

Figure 2:
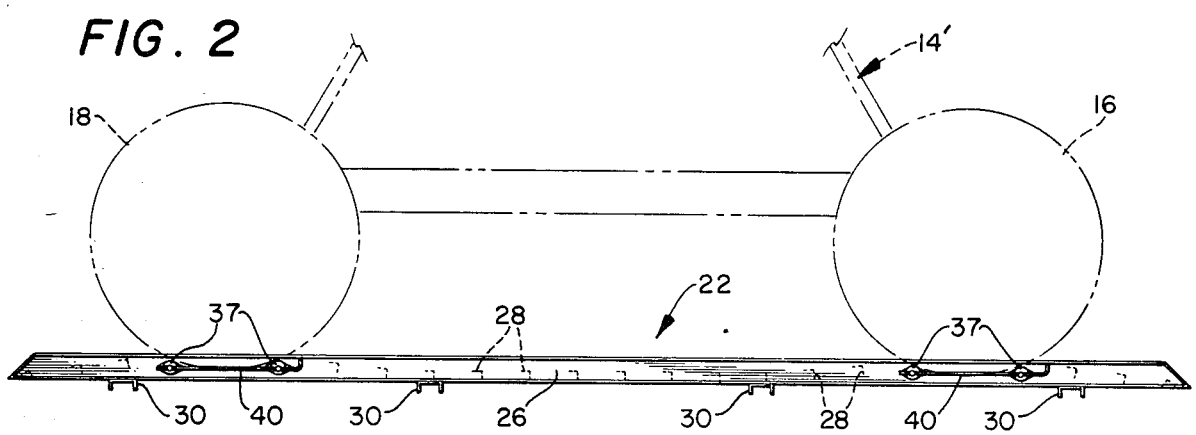
FIG. 2 is an enlarged, side elevational view of a stop mechanism made in accordance with the present invention, with some parts thereof being shown in phantom; and, with part of a prior art tower mechanism being associated therewith by the dot-dash lines.

As seen in FIG. 2, together with other figures of the drawings, tower 14' transfers the weight of the traveling irrigation system into longitudinally spaced wheels 16 and 18, while traveling circumferentially as indicated by numeral 20 in FIG. 1. A stop mechanism 22, made in accordance with the present invention, is placed in the projected path of travel respective to one of the towers 14' so that the rotated wheels 16 and 18 can be made to drive longitudinally across the stop mechanism 22.

Figure 3:
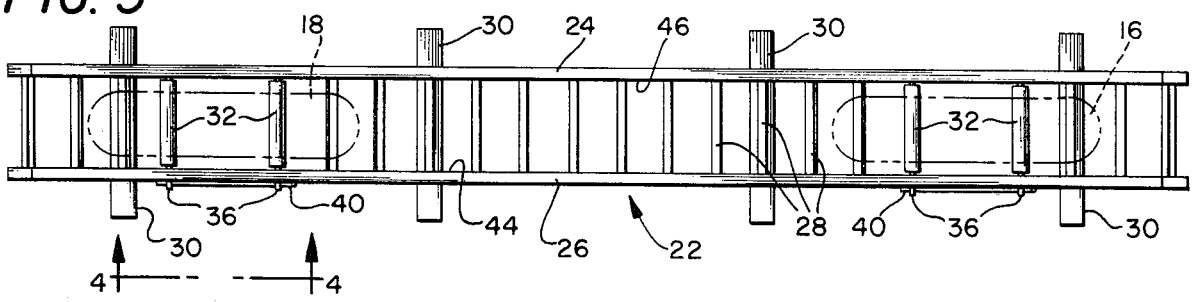
FIG. 3 is a top plan view of the apparatus disclosed in FIG. 2, with a footprint of a tower apparatus being suggested by the dot-dash lines.

As seen disclosed in FIGS. 2 and 3, the stop mechanism includes an elongated frame adapted to lie flat on the ground, and having opposed confronting side members 24 and 26, which preferably are spaced from one another and arranged parallel respective to one another. A plurality of lateral members 28 are connected to the side members and rigidly affix one member respective to the other, while at the same time provides an upper supporting surface by which a wheel 16 or 18 can be supported as the wheel travels across the frame in a direction longitudinally of the side members. Two spaced pairs of rollers 32 are arranged with each roller being laterally disposed respective to the side members.

A plurality of lateral supports 30, preferably in the form of relatively wide channel beams, are attached in underlying relationship respective to each of the confronting side members 24 and 26. The supports preferably extend outwardly away from each of the side members in the illustrated manner of FIGS. 3, 5, and 6; and, are arranged to bottom support the stop mechanism.

Figure 5:
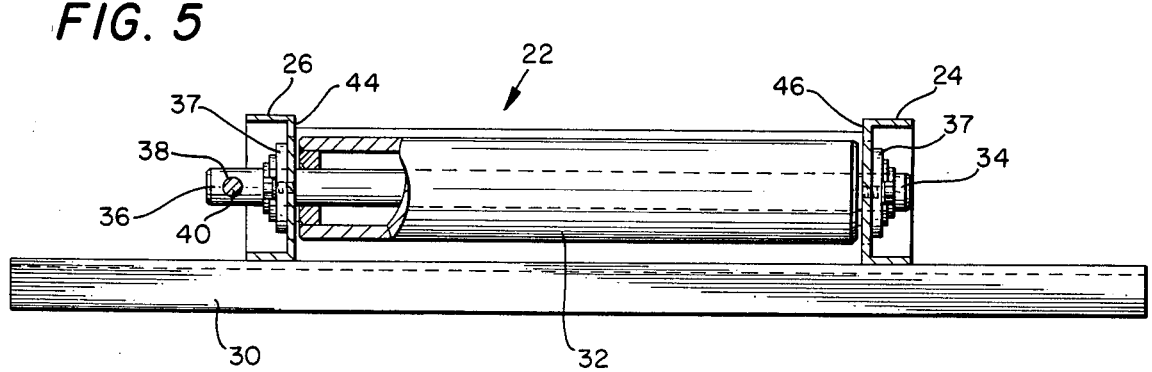
FIG. 5 is a part cross-sectional view taken along lines 5—5 of FIG. 4, with some parts thereof being removed therefrom in order to more clearly disclose the details of the interior of part of the apparatus; and, FIG. 6 is a broken, perspective, partly disassembled view of the apparatus disclosed in some of the foregoing figures.

Each roller of the pairs of rollers have the opposed ends thereof journaled to the side members in the illustrated manner of FIG. 5. The rollers preferably are arranged in two spaced pairs and positioned along the length of the main frame so that they simultaneously accommodate the spaced drive wheels 16 and 18 in supported relationship thereon. The rollers and lateral member are arranged in close proximity respective to one another at a distance to enable the driven wheels 16 and 18 to travel thereacross in a longitudinal direction respective to the side members.

Figure 4:
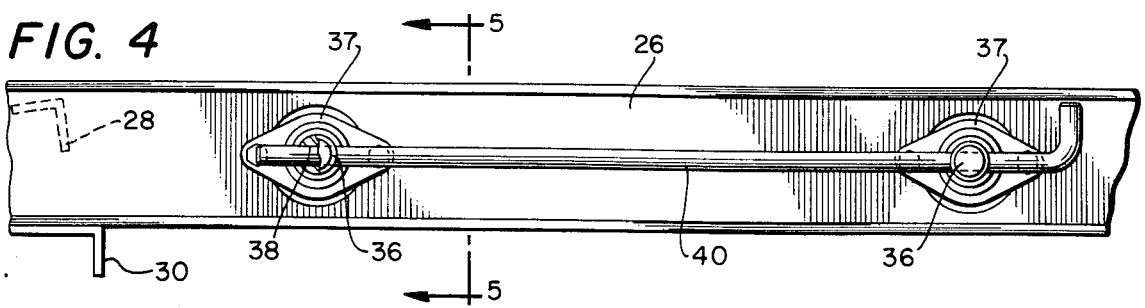
FIG. 4 is an enlarged, fragmentary, representation of part of the apparatus disclosed in FIG. 3, looking generally in the area indicated by the arrows at numerals 4—4.

In FIGS. 4 and 5, the novel stop mechanism includes means for selectively securing each of the rollers against rotation. This is accomplished by extending part of the roller, as for example, the hub or axle 36 outwardly through frame member 26. A bore 38 is formed perpendicularly through the hub member, with the bore of adjacent rollers being axially aligned with one another when the rollers are properly indexed respective to one another. A roller lock rod 40 is extended through the bore of adjacent rollers, thereby locking the rollers together and rendering each of the rollers non-rotatable respective to one another and to the frame. A rod holder 42 is provided along the outer surface of one of the side members in the illustrated manner of FIG. 6.

Figure 6:
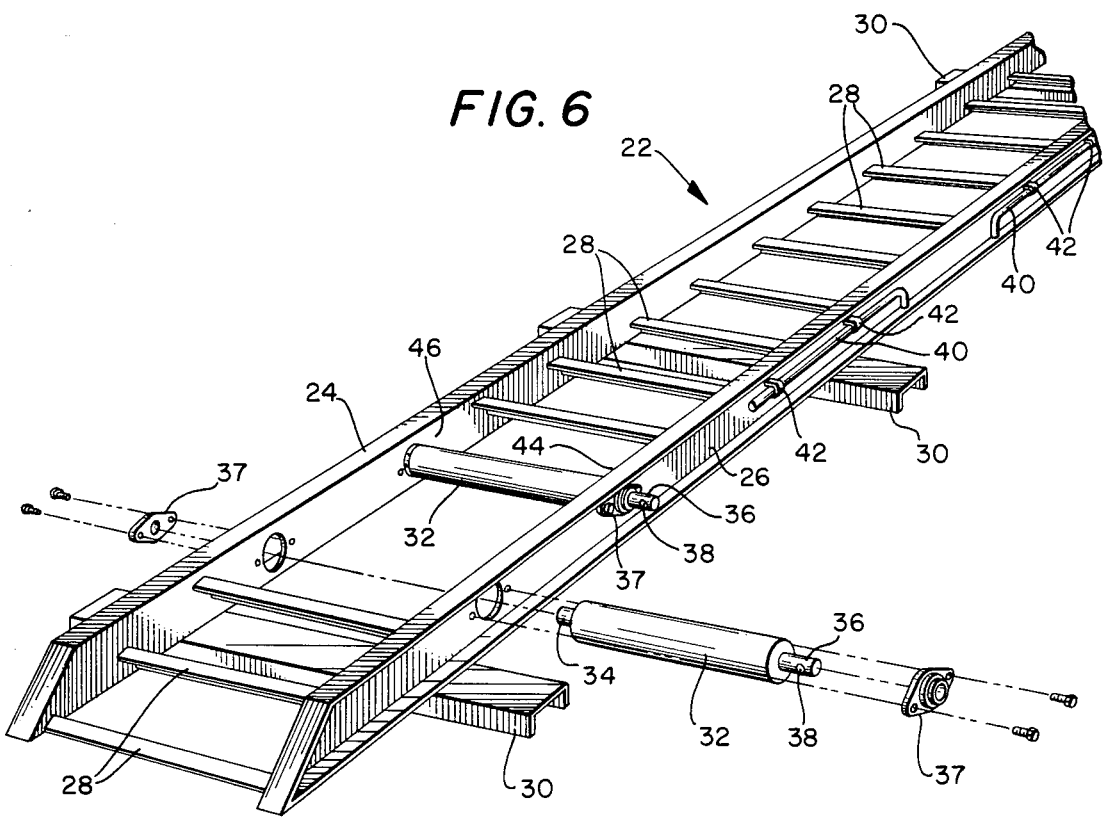

The rollers are journaled to the side members by a commercially available flange-type bearing 37 seen illustrated in FIGS. 4–6, although other journal means may equally well be employed while remaining within the comprehension of this invention.

As best indicated in FIGS. 2–4, the lateral members 28 are placed at a relatively low elevation at each opposed marginal end of the elongated frame. The lateral members are progressively increased in elevation towards each pair of rollers 32 and progressively decrease in elevation along a medial length of the elongated frame. This arrangement of the rollers and lateral members assist in driving the tower onto the stop mechanism. As the first or forward tower wheel engages the first lateral member at one end of the stop mechanism, the second wheel 18, for example, is in traction with the surface of the earth so that wheel 18 develops traction with the soil while wheel 16 develops traction with the first and lowest lateral member. As the tower is propelled across the stop mechanism, the first wheel 16 engages the first pair of rollers, and traction of the first wheel 16 is momentarily lost due to the rolling action affected by the low friction bearings 37 associated with the first pair of rollers. At this time however, wheel 18 is still in traction with the ground, and thereby forces wheel 16 to continue traveling towards a medial length of the stop mechanism. Therefore, as wheel 16 is entering a medial length of the stop mechanism, it gravitates in a downward direction as wheel 18 engages the lateral members at the entrance into the stop mechaism. This action assists wheel 18 in climbing onto the first lateral member and up onto its respective roller. Wheels 16 and 18 simultaneously drop into the intervening space between adjacent rollers of a pair of rollers, and as soon as this happens, travel of the self propelled traveling irrigation system is interrupted. The driven wheels 16 and 18 continue to rotate, however, due to the nature of the rollers, the wheels are "free wheeling" and therefore cannot propel tower 14' respective to the ground due to the action of the stop mechanism. Tower 14' is the lead tower from which all of the other towers receive a signal to advance and maintain alignment therewith. Hence, when the other towers receive a signal that the lead tower is lagging, the entire system is shut down.

The tower 14' can enter from either end of the stop mechanism, and can leave in either direction. When it is desired to drive the tower from the stop mechanism, a roller lock rod 40 is inserted into lateral bore 38 of the hub 36, and each of the rollers are rotated an appropriate amount until the bores of a pair of rollers are axially aligned with one another. This is easily accomplished although, at the same time, a drive wheel is being bottom supported by a pair of rollers which must be individually rotated manually. Next the rod is placed through each of the bores associated with a pair of rollers in the illustrated manner of FIGS. 2–4.

The rollers, having been rendered non-rotatable, now offer sufficient traction to the wheels so that when power is again applied to drive wheels 16 and 18 in the manner of FIG. 2, the apparatus is driven in either desired direction across the stop mechanism.

The present invention can be adapted for use in conjunction with a number of different traveling irrigation systems, by relocating the relative position of the pairs of rollers so that when the fore and aft drive wheels of a tower enter the stop mechanism, the wheels simultaneously come to rest between the appropriate pair of rollers.

In the Reinke Electrogator Irrigation System, for example, the distance between the centers of wheels 16 and 18 is 157 inches, and accordingly, the centers between adjacent pairs of rollers are spaced apart a like amount, with the adjacent rollers of a pair of rollers being spaced on 23 inch centers. The lateral members located between the pairs of rollers preferably are $1\frac{1}{2} \times 20$ inch angle iron, 3/16 inch thick, placed on 10 inch centers with there being a total of 18 lateral supports employed. At the entrance of the main frame, the lateral supports are spaced slightly closer together. The lateral support members are also placed very close to each of the rollers to assist the wheels in transition from the lateral members onto the rollers. There are, of course, no lateral members located between adjacent rollers of a pair of rollers.

The roller lock rod is a $\frac{3}{4}$ inch diameter bar 29 inches in length and preferably additionally includes the illustrated out-turned handle portion. The rollers are $3\frac{1}{2}$ inches o.d. having $1\frac{1}{4}$ inch shafts extending from opposed ends thereof.

The rollers and bearings are mounted with bolts so that they can be easily removed, replaced, or repositioned along the main frame member should the need arise in order to adapt the stop mechanism to a different wheel base. The main frame employs two $5 \times 1\frac{3}{4}$ inch channel iron members, $\frac{1}{4}$ inch thick, and 20 feet long, set 20 inches apart. One end of each roller must extend far enough through the bearings to accommodate the roller lock rods 40.

Alternatively, the axial bore 38 can be made through other parts of the roller; however, such a location may be undesirable because it may become difficult to manipulate the rollers with the lock rod so that the bores are properly aligned due to the presence of the drive wheels 16 and 18. It is also possible to employ a hex head at the marginal terminal end of the axle 36 so that the hex head can be engaged with a socket placed on a large rachet-type wrench, and such a modification is deemed to be comprehended by the present invention.

The present stop mechanism provides a safety protective device for a center pivot irrigation system. The stop mechanism can be placed in the projected travel of the irrigation system and thereby alleviate any of the before described undesirable situations which may occur in the absence of an operator. When each of the drive wheels enters the stop mechanism, each wheel drops onto its respective set of rollers and the tower will in effect sit still in the stop mechanism, spinning each wheel in its set of rollers until the shut down switch associated with the irrigation system is activated (usually 5 minutes). The tower supported in the stop mechanism must be the one that controls the entire system, and which is designed to shut down the entire system if the tower does not move a set length within a predetermined period of time. The shut down system is known to those skilled in the art.

The four supports 30 are adequate to prevent the stop mechanism from sinking down into wet soil that would otherwise allow the driven wheels to regain contact with the ground and roll on through the stop system.

When it is desired to reactivate the sprinkler system, the lock rod is placed through the aligned bores 38 in each of the roller shafts, thereby locking the rollers together and allowing the unit to propel itself out of the stop mechanism. The roller lock rods are then stored in the rod holders 42 and the stop mechanism is made ready to stop the pivot system when it again reaches the next desired location. The stop mechanism is easily moved from one to another location with a simple lift device associated with a farm tractor. This feature allows the use of the stop mechanism at any location during the irrigation process thereby relieving the operator from unnecessarily waiting for hours during the day or night at the irrigation field simply to shut the irrigation system down when it reaches the desired location.

I claim:

1. A stop mechanism for use in interrupting the travel of a self propelled traveling irrigation apparatus of the type which is propelled by driven ground engaging wheels, comprising:

an elongated frame adapted to lie flat on the ground and having opposed confronting side members, lateral members connected to said side members for supporting a wheel when the wheel travels across said frame in a direction longitudinally of said side members;

a pair of rollers arranged laterally respective to said side members, each roller of said pair of rollers having opposed ends journaled respective to said side members; said rollers and said lateral members are spaced in close proximity to one another to enable a driven wheel to travel in supported relationship thereacross in a longitudinal direction respective to said side members;

means for selectively securing each said roller against rotation so that the wheels can drive the irrigation apparatus out of either end of the stop mechanism; said means for selectively securing each said roller in a bore formed laterally through part of said roller; the bore of one roller can be brought into axial alignment with the bore of an adjacent roller; an elongated rigid member of a diameter to be received within each said bore, said elongated member, when extended into each bore, locks one roller to the adjacent roller.

2. The stop mechanism of claim 1 wherein there are two pairs of rollers arranged in spaced relationship and positioned respective to said side members to simultaneously supportingly engage a pair of longitudinally spaced wheels of the traveling irrigation apparatus.

3. The stop mechanism of claim 1 wherein said elongated frame has a medial length and opposed marginal ends, the lateral members have upper surfaces located at the medial length of said elongated frame and at each opposed marginal end of said elongated frame and positioned at lower elevations respective to the uppermost surface of the rollers so that a forward wheel gravitates to a lower elevation as a rear wheel enters said stop mechanism.

4. The stop mechanism of claim 1 wherein each said roller includes an axle which extends outwardly away from said side members, said bore is formed laterally through part of said axle; the bore of one axle can be brought into axial alignment with the bore of an adjacent axle by placing the elongated rigid member through one said bore to thereby move the bores of adjacent axles into axial alignment and thereafter the rigid member secures one axle respective to the adjacent axle.

5. The stop mechanism of claim 1 wherein said means for selectively securing each said roller is an axle which extends through one said side member, said bore is formed through said axle at a location outwardly one of said side members
so that a bar can be placed through one bore and the roller turned until the bore of an adjacent axle is aligned enabling the bar to be placed through both adjacent bores.

6. The stop mechanism of claim 1 wherein there are two pairs of rollers arranged in spaced relationship and positioned respective to said side members to simultaneously engage a pair of longitudinally spaced wheels of a traveling irrigation apparatus;

there being lateral members located at a medial portion of said elongated frame and at the opposed marginal ends of said elongated frame which are located at a lower elevation respective to said rollers so that a forward wheel gravitates to a lower elevation as a rear wheel climbs up onto a first lateral member located at one end of said elongated frame;

said elongated frame is free of obstruction at each marginal end thereof so that the wheels of a traveling irrigation apparatus can travel onto one marginal end of the elongated frame and engage the two pairs of rollers and the travel of the traveling irrigation apparatus is thereby interrupted; and thereafter, the pairs of rollers are secured against rotation while the wheels are supported thereon, and then the traveling irrigation apparatus can be driven across another marginal end of the elongated frame.

7. A stop mechanism for use in interrupting the travel of a self propelled traveling irrigation apparatus of the type which is propelled by driven ground engaging wheels, comprising:

an elongated frame adapted to lie flat on the ground and having opposed confronting side members, lateral members connected to said side members for supporting a wheel when the wheel travels across said frame in a direction longitudinally of said side members;

a pair of rollers arranged laterally respective to said side members, each roller of said pair of rollers having opposed ends journaled respective to said side members; said rollers and said lateral members are spaced in close proximity to one another to enable a driven wheel to travel in supported relationship thereacross in a longitudinal direction respective to said side members;

means for selectively securing each said roller comprising a bore formed laterally through part of each said roller; the bore of one roller can be brought into axial alignment with the bore of an adjacent roller; and, an elongated rigid member which can extend through each said bore and thereby lock one roller to the adjacent roller.

8. The stop mechanism of claim 7 wherein said elongated frame has a medial length and opposed marginal ends, the lateral members have upper surfaces located at the medial length of said elongated frame and at each opposed marginal end of said elongated frame and positioned at lower elevations respective to the uppermost surface of the rollers so that a forward wheel gravitates to a lower elevation as a rear wheel enters said stop mechanism.

9. The stop mechanism of claim 7 wherein each said roller includes an axle which extends outwardly away from said side members, said bore is formed laterally through part of said axle; the bore of one axle can be brought into axial alignment with the bore of an adjacent axle by placing the elongated rigid member through one said bore to thereby move the bores of adjacent axles into axial alignment and thereafter the rigid member secures one axle respective to the adjacent axle.

10. A stop mechanism for use in interrupting the travel of a self propelled traveling irrigation system of the type which is propelled by driven ground engaging wheels, comprising:
an elongated frame adapted to lie flat on the ground said elongated frame includes opposed confronting side members, lateral members connected to said side members for supporting a wheel when the wheel travels across said frame in a direction longitudinally of said side members;
a pair of rollers arranged laterally respective to said side members, each roller of said pair of rollers having opposed ends journaled respective to said side members; said rollers and said lateral members are spaced from one another and arranged in close proximity to one another to enable a driven wheel to travel in supported relationship thereacross in a longitudinal direction respective to the side members:

means for selectively securing each said roller against rotation so that a wheel supported thereon can cause the irrigation system to be driven out of either end of the stop mechanism;
each said roller includes an axle having a marginal end which extends outwardly away from said side members, said means for selectively securing each said roller includes means associated with the marginal end of the axle which cooperates with an elongated rigid member in a manner to secure one axle respective to the adjacent axle and thereby render each said roller non-rotatable.

11. The stop mechanism of claim 10 wherein a bore is formed laterally through part of each said axle; the bore of one axle can be brought into axial alignment with the bore of an adjacent axle; the elongated rigid member is of a diameter to be received within each said bore and thereby locks one roller to the adjacent roller.

12. The stop mechanism of claim 11 wherein said elongated frame has a medial length and opposed marginal ends, the lateral members have an upper surface located at the medial length of said elongated frame and at each opposed marginal end of said elongated frame and positioned at a lower elevation respective to the uppermost surface of the rollers so that a forward wheel gravitates to a lower elevation as a rear wheel enters said stop mechanism.

13. The stop mechanism of claim 10 wherein there are two pairs of rollers arranged in spaced relationship and positioned respective to said side members to simultaneously supportingly engage a pair of longitudinally spaced wheels of the traveling irrigation system;
wherein each said axle has a bore formed laterally therethrough; the bore of one axle can be brought into axial alignment with the bore of an adjacent axle; and, the elongated rigid member can extend through each said bore and thereby lock one roller to the adjacent roller.

* * * * *